United States Patent
Liu

(10) Patent No.: US 11,399,307 B2
(45) Date of Patent: Jul. 26, 2022

(54) SERVICE AUTHORIZATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/325,089

(22) Filed: May 19, 2021

(65) Prior Publication Data
US 2021/0274376 A1    Sep. 2, 2021

Related U.S. Application Data

(63) Continuation of application No. PCT/CN2019/072026, filed on Jan. 16, 2019.

(51) Int. Cl.
*H04W 28/02* (2009.01)
*H04W 48/14* (2009.01)
(Continued)

(52) U.S. Cl.
CPC ....... *H04W 28/0268* (2013.01); *H04W 48/14* (2013.01); *H04W 48/16* (2013.01); *H04W 84/042* (2013.01)

(58) Field of Classification Search
CPC .......... H04W 28/0268; H04W 84/042; H04W 48/16; H04W 48/14; H04W 12/06;
(Continued)

(56) References Cited

U.S. PATENT DOCUMENTS

2018/0376446 A1* 12/2018 Youn .................... H04W 60/06

FOREIGN PATENT DOCUMENTS

| CN | 108401275 A | 3/2018 |
| CN | 108966691 A | 12/2018 |

(Continued)

OTHER PUBLICATIONS

International Search Report of corresponding PCT application No. PCT/CN2019/072026, dated Oct. 15, 2019.
(Continued)

*Primary Examiner* — Diane D Mizrahi
(74) *Attorney, Agent, or Firm* — Ladas & Parry LLP

(57) ABSTRACT

Embodiments of the present application provide a service authorization method, a terminal device and a network device. Aiming at NCIS, the network device can authorize the terminal device, so that the terminal device can carry out the NCIS smoothly. The service authorization method includes: receiving, by a terminal device, first information, where the first information includes first indication information used to indicate whether a first service is allowed, the first service supports transmission on a side direct interface and a wireless interface, terminal devices in a session for the first service belong to a same group, and the terminal devices in the same group come from at least one public land mobile network PLMN.

22 Claims, 4 Drawing Sheets

(51) Int. Cl.
 *H04W 48/16* (2009.01)
 *H04W 84/04* (2009.01)
(58) Field of Classification Search
 CPC ..... H04W 12/00; H04W 8/186; H04W 60/00; H04W 28/0205; H04W 28/0231; H04W 76/14
 See application file for complete search history.

(56) References Cited

FOREIGN PATENT DOCUMENTS

| | | |
|---|---|---|
| KR | 20160078461 A | 7/2016 |
| WO | 2020147044 | 7/2020 |

OTHER PUBLICATIONS

OPPO."NCIS Use Case-Multiple PLMN Users Joining the Same Group" 3GPP TSG-SA WG 1 Meeting #83 S1-182127, Aug. 24, 2018, entire document.

OPPO. "Interactive Service Supporting" 3GPP TSG-SA WG1 Meeting #83 S1-182532, Aug. 24, 2018, entire document.

3GPP TP 22.842 V1.0.0 (Dec. 2018), 3rd Generation Partnership Project; Technical Specification Group Services and System Aspects; Study on Network Controlled Interactive Services (Release 17), Dec. 2018, entire document.

3GPP TS 23.303 V15.1.0 (Jun. 2018), 3rd Generation Partnership Project; Technical Specification Group Services and System Aspects; Proximity-based services (ProSe); Stage 2 (Release 15), Jun. 2018, entire document.

Written Opinion of the international Searching Authority in International application No. PCT/CN2019/072026, dated Oct. 15, 2019 with English translation provided by Google Translate.

The EESR of corresponding European application No. 19910511.5, dated Sep. 22, 2021.

The first Office Action of corresponding Indian application No. 202117038571, dated Apr. 13, 2022.

The second Office Action of corresponding European application No. 19910511.5, dated May 25, 2022.

* cited by examiner

SERVICE AUTHORIZATION METHOD, TERMINAL DEVICE AND NETWORK DEVICE

CROSS-REFERENCE TO RELATED APPLICATION

This application is a continuation of International Application No. PCT/CN2019/072026, filed on Jan. 16, 2019, the disclosure of which is hereby incorporated by reference in its entirety.

TECHNICAL FIELD

Embodiments of the present application relate to the field of communication, and more particularly, to a service authorization method, a terminal device and a network device.

BACKGROUND

With the continuous development of the application of 5th-Generation new radio (5G NR), higher requirements are put forward for the service quality such as rate, delay, packet loss rate, high-speed codec, etc. For example, for virtual reality (VR) games, the rate should reach 10 Gbps, and the packet loss rate should not exceed 10E-4. At the same time, in order to meet the needs of augmented reality (AR)/VR, games and other applications, a new type of service is proposed, for example, it can be called network controlled interactive services (NCIS). However, how to realize the NCIS is an urgent problem to be solved.

SUMMARY

Embodiments of the present application provide a service authorization method, a terminal device and a network device. Aiming at NCIS, the network device can authorize the terminal device, so that the terminal device can carry out the NCIS smoothly.

In a first aspect, there is provided a service authorization method, which includes:

receiving, by a terminal device, first information, where the first information includes first indication information used to indicate whether a first service is allowed, the first service supports transmission on a side direct interface and a wireless interface, terminal devices in a session for the first service belong to a same group, and the terminal devices in the same group come from at least one public land mobile network (PLMN).

In an embodiment, the terminal device may receive the first information from a core network device, for example, the terminal device receives the first information sent by an access and mobility management function (AMF) network element.

It should be noted that the first service can be NCIS, which is mainly aimed at AR/VR, games and other applications. The first service supports transmission on a side direct interface and a wireless interface, terminal devices in a session for the first service belong to a same group, and the terminal devices in the same group come from at least one PLMN. There are five terminal devices in an NCIS group, among which three are terminal devices of PLMN 1 and two are terminal devices of PLMN 2, where the three terminal devices of PLMN 1 communicate with each other by using the side direct interface and communicate with the other two terminal devices of PLMN 2 by using the wireless interface.

In the embodiments of the present application, the wireless interface may be a Uu interface implemented based on a base station or be an Nwu interface implemented based on a wireless-fidelity access point (WI-FI AP) in a non-3GPP interworking function (N3IWF).

In a second aspect, there is provided a service authorization method, which includes:

sending, by a network device, first information, where the first information includes first indication information used to indicate whether the first service is allowed by a terminal device, the first service supports transmission on a side direct interface and a wireless interface, terminal devices in a session for the first service belong to a same group, and the terminal devices in the same group come from at least one PLMN.

In an embodiment, the network device may be an AMF network element, and the AMF network element may send the first information to the terminal device.

In an embodiment, the network device may be a unified data management (UDM) network element, and the UDM network element may send the first information to the AMF network element or to a Policy Control function (PCF) network element.

In an embodiment, the network device may be a PCF network element, and the PCF network element may send the first information to the AMF network element.

In a third aspect, there is provided a terminal device, which is configured to execute the method according to various implementation forms of the first aspect or to the first aspect as such.

Specifically, the terminal device includes a functional module configured to execute the method according to various implementation forms of the first aspect or to the first aspect as such.

In a fourth aspect, there is provided a network device, and the network device is configured to execute the method according to various implementation forms of the second aspect or to the second aspect as such.

Specifically, the network device includes a functional module configured to execute the method according to various implementation forms of the second aspect or to the second aspect as such.

In a fifth aspect, there is provided a terminal device, including a processor and a memory. The memory is configured to store a computer program, and the processor is configured to call and run the computer program stored in the memory, so as to execute the method according to various implementation forms of the first aspect or to the first aspect as such.

In a sixth aspect, there is provided a network device, including a processor and a memory. The memory is configured to store a computer program, and the processor is configured to call and run the computer program stored in the memory, so as to execute the method according to various implementation forms of the second aspect or to the second aspect as such.

In a seventh aspect, a chip is provided, which is configured to execute the method according to various implementation forms of any one of the above-mentioned first to second aspects or to the first to second aspects as such.

Specifically, the chip includes: a processor, configured to call and run a computer program from a memory, to cause a device on which the chip is installed to execute the method according to various implementation forms of any one of the above-mentioned first to second aspects or to the first to second aspects as such.

In an eighth aspect, there is provided a computer-readable storage medium configured to store computer programs that enable a computer to execute the method according to various implementation forms of any one of the above-mentioned first to second aspects or to the first to second aspects as such.

In a ninth aspect, there is provided a computer program product including computer program instructions that enable a computer to execute the method according to various implementation forms of any one of the above-mentioned first to second aspects or to the first to second aspects as such.

In a tenth aspect, there is provided a computer program, which, when run on a computer, causes the computer to execute the method according to various implementation forms of any one of the above-mentioned first to second aspects or to the first to second aspects as such.

According to the above technical solutions, for NCIS, the network device can authorize the terminal device, so that the terminal device can carry out NCIS smoothly.

DESCRIPTION OF EMBODIMENTS

The following will describe the technical solution of the embodiments of the present application with reference to the accompanying drawings of the embodiments of the present application. Obviously, the described embodiments are part of the embodiments of the present application, not all of them. Based on the embodiments of the present application, all other embodiments obtained by ordinary technicians in this field without creative labor belong to the protection scope of the present application.

The embodiments of the present application can be applied to various communication systems, such as global system of mobile communication (GSM) system, code division multiple access (CDMA) system, wideband code division multiple access (WCDMA) system, general packet radio service (GPRS) system, long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunications system (UMTS), wireless local area network (WLAN) system, wireless fidelity (WIFI) system, worldwide interoperability for microwave access (WiMAX) communication system or 5G system, or the communication system of subsequent versions.

Generally, the traditional communication system supports a limited number of connections and is easy to implement. However, with the development of communication technology, the mobile communication system will not only support traditional communication, but also support, for example, device to device (D2D) communication and machine to machine (M2M) communication, machine type communication (MTC), vehicle to vehicle (V2V) communication, etc., and the embodiments of the present application can also be applied to these communication systems.

In an embodiment, the communication system in the embodiments of the present application can be applied to a carrier aggregation (CA) scenario, a dual connectivity (DC) scenario, and a standalone (SA) network deployment scenario.

The embodiments of the present application do not limit the applied frequency spectrum. For example, the embodiments of the present application may be applied in the licensed spectrum as well as the unlicensed spectrum.

Figure 1:
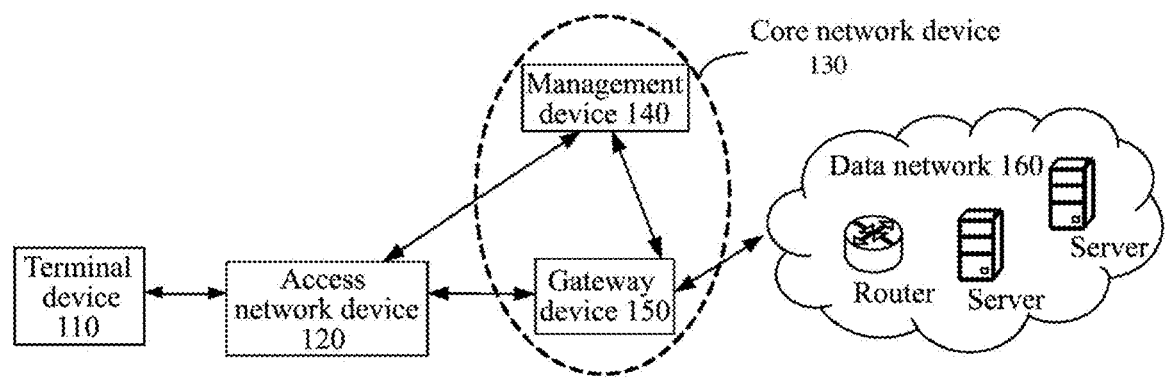
FIG. 1 is a schematic block diagram of a wireless communication system architecture 100 according to an embodiment of the present application.

Exemplarily, FIG. 1 is a schematic block diagram of a wireless communication system architecture 100 according to an embodiment of the present application. As shown in FIG. 1, the system architecture 100 includes a terminal device 110, an access network device 120, a core network device 130 and a data network (DN) 160, where the core network device 130 includes a management device 140 and a gateway device 150, and the terminal device 110 shown in FIG. 1 can be used to connect to the access network device 120 deployed by the operator through the wireless air interface, and then connect to the data network through the core network device 130; the access network device 120 is mainly configured to realize wireless physical layer functions, resource scheduling and radio resource management, wireless access control, mobility management and other functions; the core network device 130 may include a management device 140 and a gateway device 150, the management device 140 is mainly configured for device registration, security authentication, mobility management and location management of the terminal device, and the gateway device 150 is mainly configured to establish a channel with the terminal device and forward data packets between the terminal device and an external data network on the channel; a data network 160 can correspond to a variety of different service domains, such as Internet protocol multimedia subsystem (IMS), Internet, Internet protocol television (IPTV) and other operator service domains, and is mainly configured to provide a variety of data service services for terminal device, involving network devices such as servers (including servers providing multicast service), routers, gateways. It should be noted that FIG. 1 is only an exemplary architecture diagram, besides the functional units shown in FIG. 1, the network architecture may also include other functional units or functional entities, which are not limited by the embodiments of the present disclosure.

The above-mentioned terminal device can be user equipment (UE), for example, mobile phone and computer, which can also be cellular phone, cordless phone, session initiation protocol (SIP) phone, smart phone, wireless local loop (WLL) station, personal digital assistant (PDA), computer, laptop computer, handheld communication device, handheld computing device, satellite wireless device, wireless modem card, set top box (STB), customer premise device (CPE) and/or other devices for communicating over wireless systems. The access network device can be an access network (AN)/radio access network (RAN) device, and a network composed of a plurality of 5G-AN/5G-RAN nodes, and the 5G-AN/5G-RAN nodes can be the access point (AP), next generation base stations (nodeB, gNB), gNB with separate form of central unit (CU) and distributed unit (DU), transmission receive point (TRP), transmission point (TP) or some other access nodes. The above-mentioned core network device may include: the AMF network element, session management function (SMF) network element, policy control function (PCF) network element, user plane function (UPF) network element and other functional units, which can work independently or be combined together to realize some control functions. For example, AMF, SMF and PCF can be combined together as management device to complete access control and mobility management functions such as access authentication, security encryption and location registration of terminal device, as well as session management functions such as establishment, release and change of user plane transmission paths, and functions of analyzing some slice-related data (such as congestion) and terminal device-related data. The UPF, as a gateway device, mainly completes functions of routing and forwarding of user plane data, such as data messages filtering, data transmission/forwarding, rate control and generating charging information for the terminal device.

Figure 2:
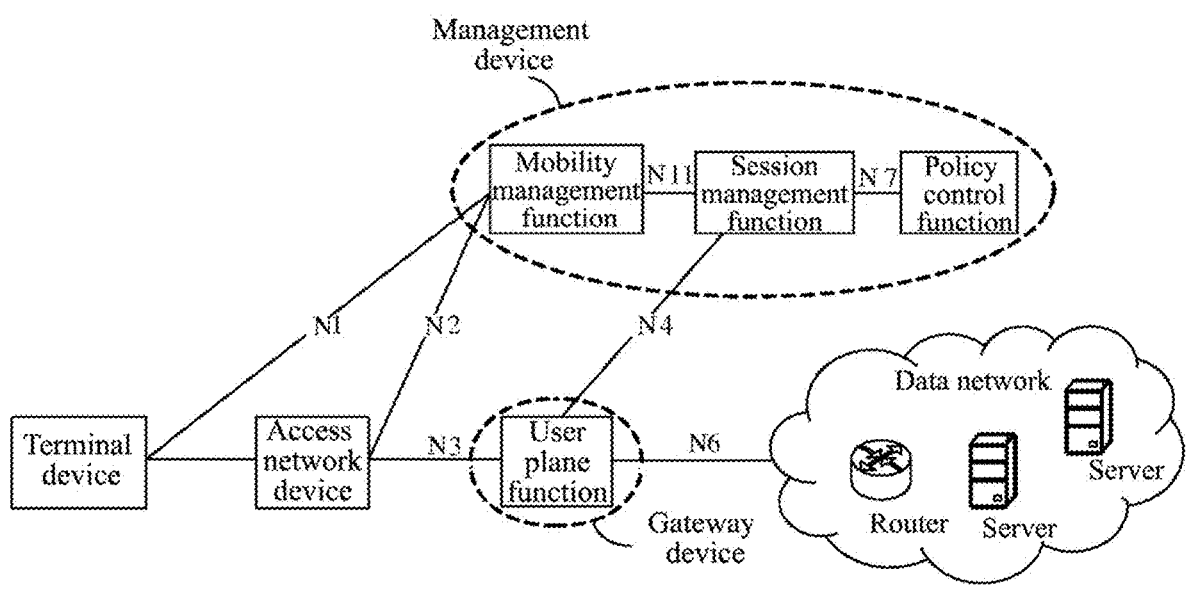
FIG. 2 is a schematic diagram of a network architecture according to an embodiment of the present application.

FIG. 2 is a schematic diagram of a network architecture according to an embodiment of the present application. In FIG. 2, functional units can establish a connection through a next generation (NG) interface to realize communication, for example, the terminal device establishes an air interface connection with a RAN device through a NR interface for transmitting user plane data and control plane signaling; the terminal device can establish a control plane signaling connection with the AMF network element through NG interface 1 (N1 for short); the AN/RAN device, such as the next generation radio access base station (NR NodeB, gNB), can establish a user plane data connection with the UPF network element through NG interface 3 (N3 for short); the AN/RAN device can establish a control plane signaling connection with the AMF network element through NG interface 2 (N2 for short); the UPF network element can establish a control plane signaling connection with the SMF network element through the NG interface 4 (N4 for short); the UPF network element can exchange user plane data with the data network through NG interface 6 (N6 for short); the AMF network element can establish a control plane signaling connection with the SMF network element through the NG interface 11 (N11 for short); the SMF network element can establish a control plane signaling connection with the PCF network element through NG interface 7 (N7 for short). It should be noted that FIG. 2 is only an exemplary architecture diagram, besides the functional units shown in FIG. 2, the network architecture may also include other functional units or functional entities (for example the core network device can further include the UDM network element and other functional units), which are not limited by the embodiments of the present application.

In the embodiment of the present application, the network device provides a service for a cell, and the terminal device communicates with the network device through transmission resources (e.g., frequency domain resources or frequency spectrum resources) used by the cell. The cell may be a cell corresponding to the network device (e.g., base station), and the cell may belong to a macro base station or a base station corresponding to a small cell, where the small cell here can include: a metro cell, a micro cell, a pico cell, a femto cell, etc. The small cell has the characteristics of small coverage and low transmission power, and is suitable for providing a high-speed data transmission service.

In the embodiment of the present application, a new type of service for AR/VR, games and other applications is introduced, which can be called NCIS. Of course, this new type of service can also be named in other ways, which is not limited by the present application.

Taking the NCIS as the new type of service is used as an example for the following description.

Sessions established for NCIS is a NCIS session, and the UE in the same NCIS session can be considered to form a NCIS group. UEs joining NCIS sessions can communicate locally, for example, by using the device to device (D2D) technology to establish a side direct interface (also called PC5 interface), or they can communicate by being away from each other, for example, by using UE-network-server-peer network-peer UE (also called by using Uu interface or cellular interface). Terminal devices joining NCIS session can come from the same PLMN or different PLMNs. For example, there are five UEs in an NCIS group, among which three are UEs of PLMN 1, two are UEs of PLMN 2, where the three UEs of PLMN 1 can communicate directly with each other using the PC5 interface, and communicate with the other two UEs of PLMN 2 using the wireless interface (such as the Uu interface or Nwu interface).

In the communication system, when terminal device needs to use a certain service, the core network device is required to authorize the terminal device before the terminal device can perform a corresponding service. How to realize the authorization to the NCIS becomes an urgent problem to be solved. To this end, the embodiment of the present application designs a method for authorizing the NCIS, thereby realizing the authorization for the NCIS, so that the terminal device can carry out NCIS.

Figure 3:
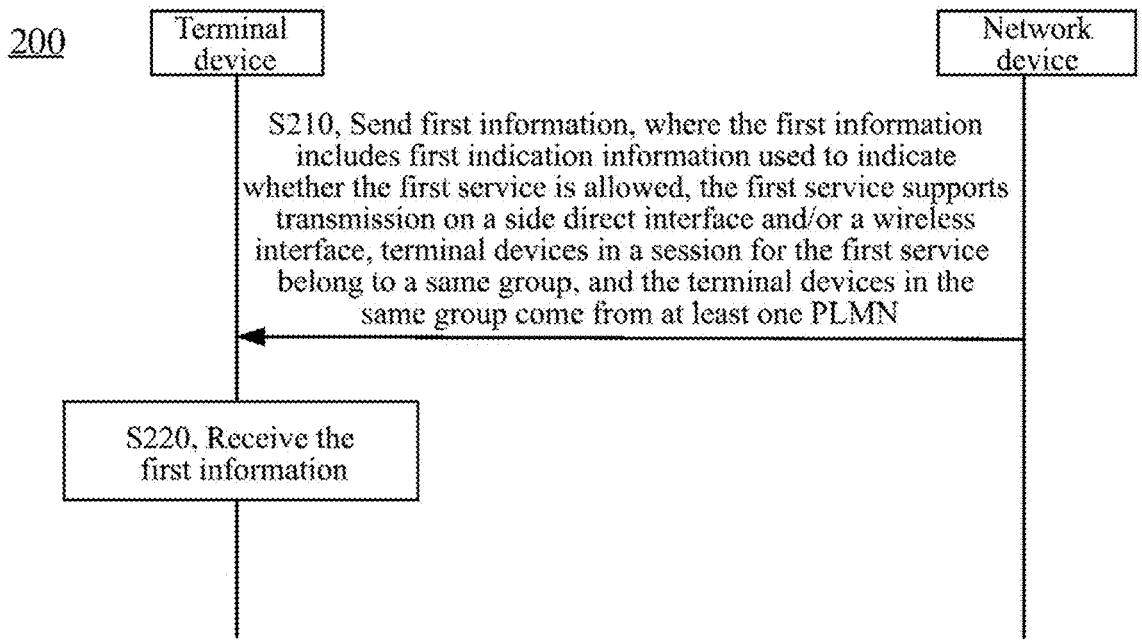
FIG. 3 is a schematic flow chart of a service authorization method according to an embodiment of the present application.

FIG. 3 is a schematic flow chart of a service authorization method 200 according to an embodiment of the present application; as shown in FIG. 3, the method 200 may include:

S210, a network device sends first information to a terminal device, where the first information includes first indication information used to indicate whether the first service is allowed, the first service supports transmission on a side direct interface and a wireless interface, terminal devices in a session for the first service belong to a same group, and the terminal devices in the same group come from at least one PLMN; and S220, the terminal device receives the first information sent by the network device.

It should be noted that the first service can be NCIS, which is mainly aimed at AR/VR, games and other applications. The first service supports transmission on a side direct interface and a wireless interface, terminal devices in a session for the first service belong to a same group, and the terminal devices in the same group come from at least one PLMN. For example, there are five terminal devices in an NCIS group, among which three are terminal devices of PLMN 1 and two are terminal devices of PLMN 2, where the three terminal devices of PLMN 1 communicate with each other by using the side direct interface and communicate with the other two terminal devices of PLMN 2 by using the wireless interface.

In the embodiments of the present application, the wireless interface may be a Uu interface implemented based on a base station or an Nwu interface implemented based on a WI-FI AP in a N3IWF. The side direct connection interface may be an interface for communication connection between terminals based on a sidelink, and may also be called a PC5 interface.

In an embodiment, the expression form of the first indication information may be brand-new indication information, external network server information (DNN), or single-network slice selection assistance information (S-NSSAI).

In an embodiment, in the embodiment of the present application, the first information also includes at least one of the following information:

a radio access technology (RAT) that is allowed for using by the first service;

a quality of service (QoS) parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

In an embodiment, in the first information, the RAT includes, but is not limited to, at least one of LTE and NR.

In an embodiment, in the first information, the QoS parameter includes, but is not limited to, at least one of the following: a 5G QoS index (5QI), a minimum guaranteed bit rate (GBR) and a maximum bit rate (MBR).

In an embodiment, in the above-mentioned first information, if the terminal device is allowed as the group header in the group to which the terminal device belongs, the terminal device has an ability to establish a session for the first service for other terminal devices belonging to the same group, and the terminal device has an ability to request a wireless resource for all terminal devices belonging to the same group from the network device, and the terminal device is capable of serving as a medium or relay for all terminal devices belonging to the same group to communicate with the network device.

It should be noted that the group header in the group can initiate an establishment of NCIS PC5 session (session for the first service) to the network device instead of other terminal devices in the group, and request the network device for wireless resources that can be used by all terminal devices in the group, and serve as a medium or relay for the terminal devices in the group to communicate with the network devices.

It should be noted that in the above-mentioned first information, whether users of different PLMNs are allowed to use the side direct connection interface for group communication is used to inform the terminal device whether to allow the terminal devices of different PLMSs to use PC5 interface radio resources of operators for communication when there are terminal devices of different PLMSs in the group; if it is allowed, the allowed PLMS list and group list.

In an embodiment of the present application, the terminal device may report the capability of supporting the first service, so that the network device can perform authorization for the first service. In an embodiment, the terminal device sends second information to the network device, where the second information is used to indicate that the terminal device has an ability to support the first service. For example, the terminal device sends the second information to the network device in a network registration process.

In an embodiment, in an embodiment of the present application, the terminal device receives the first information sent by the network device in or after the network registration process.

In an embodiment, in an embodiment of the present application, the network device may be an AMF network element, a PCF network element or a UDM network element.

In an embodiment, when the network device is the AMF network element, the AMF network element may obtain information included in the first information from the UDM network element or the PCF network element.

For example, during the network registration process of the terminal device, the AMF network element obtains subscription information from the UDM network element, where the subscription information carries the information included in the first information.

For another example, after a network registration of the terminal device, the AMF network element obtains a container for transparent transmission of the AMF network element from the UDM network element, where the container carries the information included in the first information.

For another example, after the network registration of the terminal device, the AMF network element obtains a container for transparent transmission of the AMF network element from the PCF network element, where the container carries the information included in the first information.

In an embodiment, when the network device is the PCF network element, the PCF network element may obtain the information included in the first information from the UDM network element, and send the first information to the terminal device through the AMF network element.

For example, after the network registration of the terminal device, the PCF network element asks the UDM network element for subscription information for the terminal device carrying the information included in the first information, and sends the first information to the terminal device through the AMF network element. At this time, the first information can be a container for transparent transmission of the AMF network element or information that is capable of being interpreted by the AMF network element.

In an embodiment, when the network device is the UDM network element, the UDM network element may send the first information to the terminal device through the AMF network element.

For example, after the network registration of the terminal device, the UDM network element sends the first information to the terminal device through the AMF network element. At this time, the first information can be a container for transparent transmission of the AMF network element or information that is capable of being interpreted by the AMF network element.

In an embodiment, in an embodiment of the present application, the UDM network element obtains the information included in the first information from the operator, or obtains the information included in the first information from an external application server.

The service authorization method provided by the embodiment of the present application will be described in detail with reference to specific embodiment.

Figure 4:
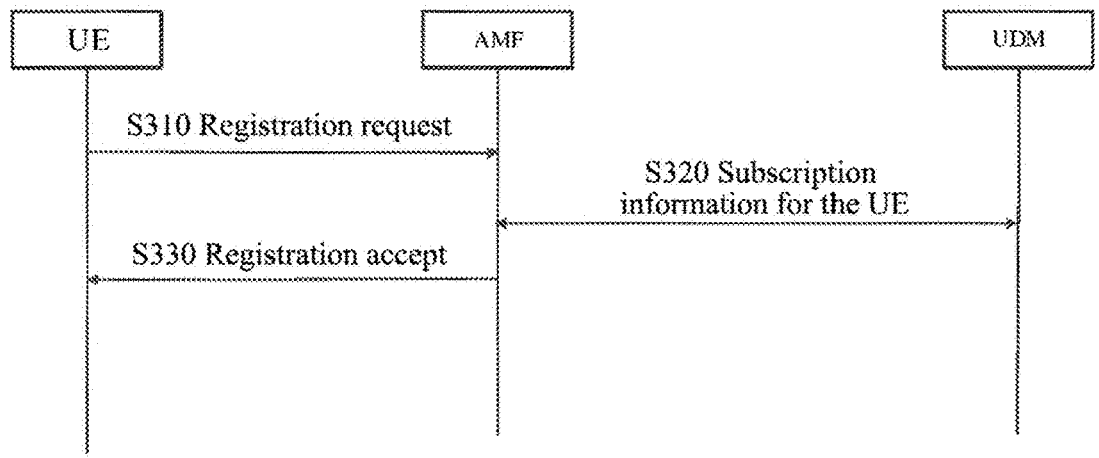
FIG. 4 is a schematic flow chart of a service authorization method according to an embodiment of the present application.

In an embodiment, as an embodiment, the service authorization method 300 includes steps S310 to S330, as shown in FIG. 4.

S310, the UE sends a registration request to the AMF network element.

Specifically, the registration request is used to request registration on the network, and the registration request carries a NCIS capability.

S320, the AMF network element asks for subscription information for the UE from the UDM network element.

Specifically, the subscription information includes the first indication information, where the first indication information is used to indicate whether the NCIS is allowed. The expression form of the first indication information may be a new indication, or DNN, or S-NSSAI.

In an embodiment, the subscription information also includes at least one of the following information:

a RAT that is allowed for using by the first service;

a QoS parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

It should be noted that the above parameters can be configured by the operator in the UDM network element or obtained by the UDM network element from an external application server.

S330, the AMF network element sends a registration accept to the UE.

The registration accept is used to inform the UE that the network registration is successful.

Specifically, if the UE has the ability to support NCIS, the registration accept includes a parameter included in the subscription information, that is, the registration accept includes the first indication information, and the registration accept also includes at least one of the following:

a RAT that is allowed for using by the first service;

a QoS parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

Figure 5:
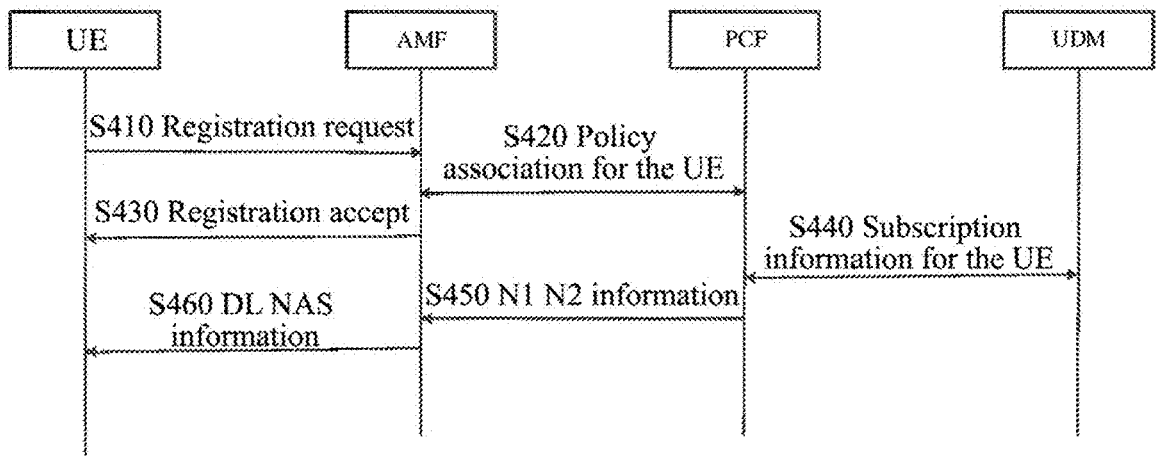
FIG. 5 is a schematic flow chart of a service authorization method according to another embodiment of the present application.

In an embodiment, as an embodiment, the service authorization method 400 includes steps S410-S460, as shown in FIG. 5.

S410, the UE sends a registration request to the AMF network element.

Specifically, the registration request is used to request registration on the network, and the registration request carries a NCIS capability.

S420, establish a policy association for the UE between the AMF network element and the PCF network element, including an UE ID, the NCIS capability, and the fact that the PCF network element acknowledges that the UE is registered on the network.

S430, the AMF network element sends a registration accept to the UE.

The registration accept is used to inform the UE that the network registration is successful.

It should be noted that the above S420 may also occur after S430.

S440, the PCF network element asks for subscription information for the UE from the UDM network element.

Specifically, the subscription information includes the UE ID and a container for transparent transmission of the AMF network element, and the container includes the first indication information, where the first indication information is used to indicate whether the NCIS are allowed. The expression form of the first indication information may be a new indication, or DNN, or S-NSSAI.

In an embodiment, the container further includes at least one of the following information:

a RAT that is allowed for using by the first service;

a QoS parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

It should be noted that the above parameters can be configured by the operator in the UDM network element or obtained by the UDM network element from an external application server.

S450, the PCF network element sends N1 N2 information to the AMF network element.

It should be noted that N1N2 can be an interface between the PCF network element and the AMF network element.

Specifically, if the UE has the NCIS capability, the N1 N2 information includes the container.

S460, the AMF network element sends downlink (DL) non-access stratum (NAS) information to the UE.

Specifically, the DL NAS information includes the container.

Figure 6:
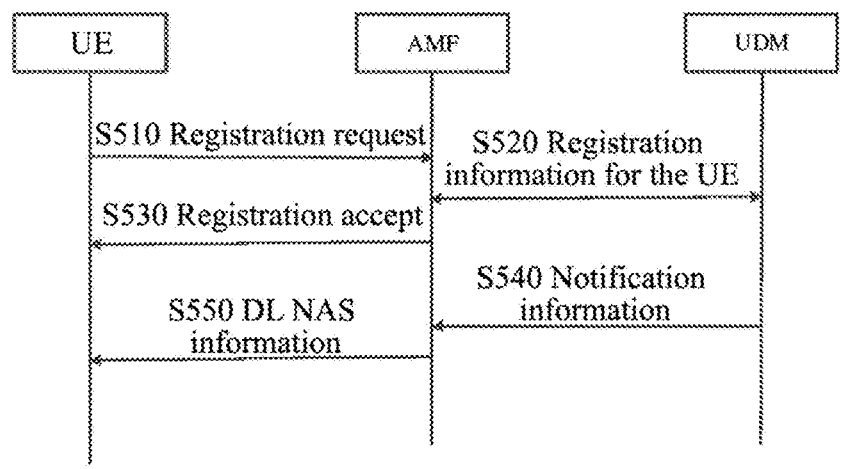
FIG. 6 is a schematic flow chart of a service authorization method according to a further embodiment of the present application again.

In an embodiment, as another embodiment, as shown in FIG. 6, the service authorization method 500 includes steps S410 to S550.

S510, The UE sends a registration request to the AMF network element.

Specifically, the registration request is used to request registration on the network, and the registration request carries a NCIS capability.

S520, the AMF network element sends registration information for the UE to the UDM network element.

Specifically, the registration information is used to inform the UDM network element that the UE has registered on the network, and the registration information carries the NCIS capability and AMF ID.

S530, the AMF network element sends a registration accept to the UE.

The registration accept is used to inform the UE that the network registration is successful.

S540, the UDM network element sends the notification information to the AMF network element.

Specifically, if the UE has the NCIS capability, the notification information includes the UE ID and the container needs to be transparently transmitted by the AMF network element, and the container includes the first indication information, where the first indication information is used to indicate whether the NCIS are allowed. The expression form of the first indication information may be a new indication, or DNN, or S-NSSAI.

In an embodiment, the container also includes at least one of the following information:

a RAT that is allowed for using by the first service;

a QoS parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

It should be noted that the above parameters can be configured by the operator in the UDM network element or obtained by the UDM network element from an external application server.

S550, the AMF network element sends DL NAS information to the AMF network element.

Specifically, the DL NAS information includes the container.

Therefore, in the embodiment of the present application, aiming at the NCIS, the network device can authorize the terminal device, so that the terminal device can carry out the NCIS smoothly.

Figure 7:
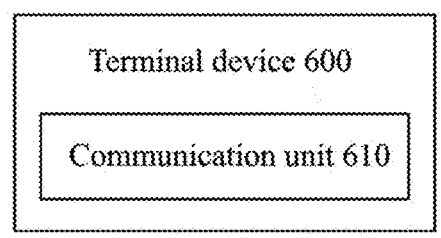
FIG. 7 is a schematic block diagram of a terminal device according to an embodiment of the present application.

FIG. 7 is a schematic block diagram of a terminal device 600 according to an embodiment of the present application. As shown in FIG. 7, the terminal device 600 may include:

a communication unit 610, configured to receive first information, where the first information includes first indication information used to indicate whether a first service is allowed, the first service supports transmission on a side direct interface and a wireless interface, terminal devices in a session for the first service belong to a same group, and the terminal devices in the same group come from at least one PLMN.

In an embodiment, the first information further includes at least one of the following information:

a RAT that is allowed for using by the first service;

a QoS parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

In an embodiment, the QoS parameter includes at least one of the following: a 5QI, a GBR and a MBR.

In an embodiment, if the terminal device is allowed as the group header in the group to which the terminal device belongs, the terminal device has an ability to establish a session for the first service for other terminal devices belonging to the same group, and the terminal device has an ability to request a wireless resource for all terminal devices belonging to the same group from the network device, and the terminal device is capable of serving as a medium or relay for all terminal devices belonging to the same group to communicate with the network device.

In an embodiment, the communication unit 610 is further configured to send second information to the network device, where the second information is used to indicate the terminal device has an ability to support the first service.

In an embodiment, the communication unit 610 is specifically configured to:

send the second information in a network registration process.

In an embodiment, the communication unit 610 is specifically configured to:

receive the first information in or after a network registration process.

It should be understood that the terminal device 600 according to the embodiment of the present application may correspond to the terminal device in the method embodiment of the present application, and the above-mentioned and other operations and/or functions in the respective unit in the terminal device 600 is used for realizing the corresponding process of the terminal device in the method 200 shown in FIG. 3, respectively, which will not be repeated herein.

Figure 8:
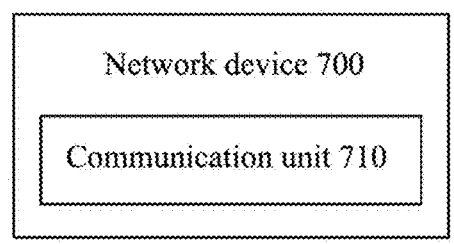
FIG. 8 is a schematic block diagram of a network device according to an embodiment of the present application.

FIG. 8 is a schematic block diagram of a network device 700 according to an embodiment of the present application. As shown in FIG. 8, the network device 700 may include:

a communication unit 710, configured to send the first information, where the first information includes first indication information used to indicate whether the first service is allowed by a terminal device, the first service supports transmission on a side direct interface and a wireless interface, terminal devices in a session for the first service belong to a same group, and the terminal devices in the same group come from at least one PLMN.

In an embodiment, the first information further includes at least one of the following information:

a radio access technology RAT that is allowed for using by the first service;

a quality of service QoS parameter that is allowed for using by the first service, and whether the QoS parameter is allowed to apply to the side direct interface and/or wireless interface;

whether the terminal device is allowed to act as a group header in a group to which the terminal device belongs;

whether a service in the group to which the terminal device belongs is allowed to use the side direct connection interface and the wireless interface;

a RAT of the side direct connection interface that is allowed for using by the first service;

whether users of different PLMNs are allowed to use the side direct connection interface for group communication, and an allowed PLMN Identity;

whether the first service is allowed to use discovery information;

whether the terminal device is allowed to act as a relay terminal to forward data in the first service to other terminal devices in the group to which the terminal device belongs; and authorizing the service in the group to which the terminal device belongs to use at least one of unicast, multicast and broadcast for transmission on the side direct connection interface.

In an embodiment, the QoS parameter also includes at least one of the following: a 5QI, a GBR and a MBR.

In an embodiment, if the terminal device is allowed as the group header in the group to which the terminal device belongs, the terminal device has an ability to establish a session for the first service for other terminal devices belonging to the same group, and the terminal device has an ability to request a wireless resource for all terminal devices belonging to the same group from the network device, and the terminal device is capable of serving as a medium or relay for all terminal devices belonging to the same group to communicate with the network device.

In an embodiment, the communication unit 710 is further configured to receive second information, where the second information is used to indicate the terminal device has an ability to support the first service.

In an embodiment, the network device 700 is a AMF network element, the communication unit 710 is further configured to, during a network registration process of the terminal device, subscription information for the terminal device from an unified data management UDM network element, where the subscription information carries information included in the first information;

the communication unit 710 is specifically configured to:

send the first information to the terminal device according to the subscription information, where the first information is used to indicate that the terminal device completed a network registration.

In an embodiment, the network device 700 is an AMF network element, the communication unit 710 is further configured to send second information to an UDM network element in a network registration process of the terminal device, where the second information is used to indicate that the terminal device has an ability to support the first service;

the communication unit 710 is further configured to receive the first information sent by the UDM network element after a network registration of the terminal device, where the first information aims at a transparent transmission of the AMF network element;

the communication unit 710 is specifically configured to:

send the first information to the terminal device after the network registration of the terminal device.

In an embodiment, the network device 700 is an AMF network element, the communication unit 710 is further configured to:

send second information to a policy control function PCF network element in a network registration process of the terminal device, where the second information is used to indicate that the terminal device has an ability to support the first service; and;

receive the first information sent by the PCF network element after a network registration of the terminal device, where the first information aims at a transparent transmission of the AMF network element;

the communication unit 710 is specifically configured to:

send the first information to the terminal device after the network registration of the terminal device.

In an embodiment, the network device 700 is an UDM network element, the communication unit 710 is further configured to receive second information sent by an AMF network element, where the second information is used to indicate that the terminal device has an ability to support the first service;

the communication unit 710 is specifically configured to:

send the first information to the AMF network element in the network registration process of the terminal device.

In an embodiment, the network device 700 is an UDM network element, the communication unit 710 is further configured to receive second information sent by a PCF network element, where the second information is used to indicate that the terminal device has an ability to support the first service;

the communication unit 710 is specifically configured to:

send the first information to the PCF network element after a network registration of the terminal device.

In an embodiment, the first information is subscription information for the terminal device, or the first information is capable of being interpreted by the terminal device only.

In an embodiment, the communication unit 710 is further configured to obtain information included in the first information from an operator, or from an external application server.

In an embodiment, the network device 700 is a PCF network element, the communication unit 710 is further configured to obtain subscription information for the terminal device from an UDM network element, where the subscription information carries information included in the first information;

the communication unit 710 is specifically configured to:

send the first information to the AMF network element according to the subscription information, where the first information is capable of being interpreted by the terminal device only.

It should be understood that the network device 700 according to the embodiment of the present application may correspond to the network device in the method embodiment of the present application, and the above-mentioned and other operations and/or functions in the respective unit in the network device 700 is used for realizing the corresponding process of the network device in the method 200 shown in FIG. 3, respectively, which will not be repeated herein.

Figure 9:
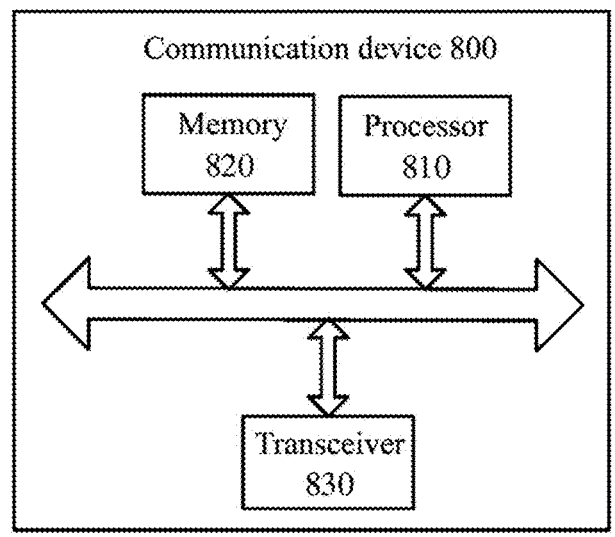
FIG. 9 is a schematic block diagram of a communication device according to an embodiment of the present application.

FIG. 9 is a schematic structural diagram of a communication device 800 according to an embodiment of the present application. The communication device may be a terminal. The communication device 800 shown in FIG. 9 includes a processor 810 which can call and run a computer program from the memory to implement the methods in embodiments of the present application.

In an embodiment, as shown in FIG. 9, the communication device 800 may further include a memory 820. The processor 810 can call and run a computer program from the memory 820 to implement the methods in embodiments of the present application.

The memory 820 may be a separate device independent of the processor 810 or may be integrated in the processor 810.

In an embodiment, as shown in FIG. 9, the communication device 800 may further include a transceiver 830, and the processor 810 can control the transceiver 830 to communicate with other devices and, in particular, may control the transceiver 830 to send/receive information or data to/from other devices.

The transceiver 830 may include a transmitter and a receiver. The transceiver 830 may further include an antenna, and the number of the antenna may be one or more.

In an embodiment, the communication device 800 may specifically be the network device in any embodiment of the present application, and the communication device 800 can implement corresponding processes implemented by the network device in the methods of the embodiments of the present application, which, for conciseness, will not be repeated herein.

In an embodiment, the communication device 800 may specifically be the terminal device in the embodiments of the present application, and the communication device 800 can implement corresponding processes implemented by the terminal device in the methods of the embodiments of the present application, which, for the sake of conciseness, will not be repeated herein.

Figure 10:
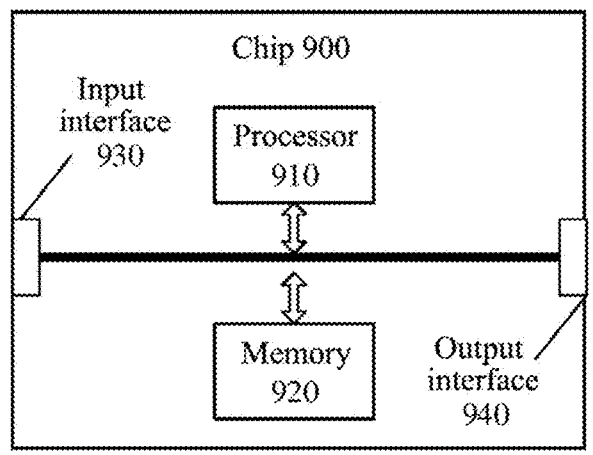
FIG. 10 is a schematic block diagram of a chip according to an embodiment of the present application.

FIG. 10 is a schematic structural diagram of a chip according to an embodiment of the present application. The chip 900 shown in FIG. 10 includes a processor 910 which can call and run a computer program from a memory to implement the methods in embodiments of the present application.

In an embodiment, as shown in FIG. 10, the chip 900 may further include a memory 920. The processor 910 can call and run a computer program from the memory 920 to implement the methods in embodiments of the present application.

The memory 920 may be a separate device independent of the processor 910 or may be integrated in the processor 910.

In an embodiment, the chip 900 may also include an input interface 930. The processor 910 can control the input interface 930 to communicate with other devices or chips. Specifically, information or data sent by other devices or chips can be acquired.

In an embodiment, the chip 900 may also include an output interface 940. The processor 910 can control the output interface 940 to communicate with other devices or chips. Specifically, information or data can be output to other devices or chips.

In an embodiment, the chip can be applied to the network device in the embodiment of the present application, and the chip can implement corresponding processes implemented by the network device in the methods in the embodiments of the present application, which, for the sake of conciseness, will not be repeated herein.

In an embodiment, the chip can be applied to the mobile device/terminal device in the embodiment of the present application, and the chip can implement corresponding processes implemented by the mobile device/terminal device in the methods of the embodiments of the present application, which, for the sake of conciseness, will not be repeated herein.

It should be understood that the chip mentioned in the embodiment of the present application may also be referred to as a system level chip, a system chip, a chip system or a system on chip, or the like.

Figure 11:
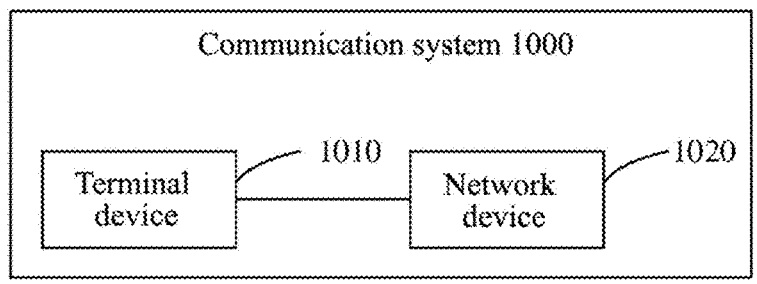
FIG. 11 is a schematic block diagram of a communication system according to an embodiment of the present application.

FIG. 11 is a schematic block diagram of a communication system 1000 according to an embodiment of the present application. As shown in FIG. 11, the communication system 1000 includes a terminal device 1010 and a network device 1020.

The terminal device 1010 can be used to realize the corresponding functions realized by the terminal device in the above methods, and the network device 1020 can be used to realize the corresponding functions realized by the network device in the above methods, which will not be described here for brevity.

It should be understood that a processor in an embodiment of the present application may be an integrated circuitry chip capable of processing a signal. In the implementation process, each step of the above method embodiments may be accomplished by an integrated logic circuit of hardware in a processor, or instructions in the form of software. The processor may be a general-purpose processor, a digital signal processor (DSP), an application specific integrated circuit (ASIC), a field programmable gate array (FPGA), or other programmable logic devices, discrete gates or transistor logic devices or discrete hardware components. The methods, steps, and logical block diagrams disclosed in the embodiments of the present application can be implemented or executed. The general purpose processor may be a microprocessor, or the processor may also be any conventional processor or the like. The steps of the method disclosed with reference to the embodiments of the present application may be directly embodied as being accomplished by the execution of the hardware decoding processor or by a combination of hardware and software modules in the processor. The software module may be located in a storage medium readily available in the art, such as a random access memory, a flash memory, a read only memory, a programmable read only memory or an electrically erasable programmable memory, a register, or the like. The storage medium is located in the memory. The processor reads information in the memory and accomplishes the steps of the above methods in combination with the hardware.

It can be understood that the memory in the embodiments of the present application may be a volatile memory or a non-volatile memory, or may include both volatile and non-volatile memories. The non-volatile memory may be a read-only memory (ROM), a programmable ROM (PROM), an erasable PROM (EPROM), an electrically EPROM (EEPROM) or a flash memory. The volatile memory can be a random access memory (RAM) that acts as an external cache. By way of example rather than limitation, RAM of many forms are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the system and method described herein are intended to include, rather than being limited to, these and any other suitable types of memories.

It should be understood that the foregoing memories are examples rather than limitations. For instance, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct rambus RAM (DR RAM), or the like. That is, the memories in the embodiments of the present application are intended to include, rather than being limited to, these and any other suitable types of memories.

A computer readable storage medium is also provided by an embodiment of the present application for storing a computer program.

In an embodiment, the computer readable storage medium can be applied to the network device in the embodiments of the present application, and the computer program enables a computer to implement corresponding processes implemented by the network device in the methods in the embodiments of the present application, which, for the sake of conciseness, will not be repeated herein.

In an embodiment, the computer readable storage medium can be applied to the mobile device/terminal device in the embodiments of the present application, and the computer program enables a computer to implement corresponding processes implemented by the mobile device/terminal device in the methods in the embodiments of the present application, which, for the sake of conciseness, will not be repeated herein.

A computer program product is also provided by an embodiment of the present application, including computer program instructions.

In an embodiment, the computer program product can be applied to the network device in the embodiments of the present application, and the computer program instructions enable a computer to implement corresponding processes implemented by the network device in the methods in the embodiments of the present application, which, for the sake of conciseness, will not be repeated herein.

In an embodiment, the computer program product can be applied to the mobile device/terminal device in the embodiments of the present application, and the computer program instructions enable a computer to implement corresponding processes implemented by the mobile device/terminal device in the methods in the embodiments of the present application, which, for the sake of conciseness, will not be repeated herein.

A computer program is also provided by an embodiment of the present application.

In an embodiment, the computer program can be applied to the network device in the embodiments of the present application, and the computer program, when executed on a computer, enables the computer to implement corresponding processes implemented by the network device in the methods in the embodiments of the present application, which, for the sake of conciseness, will not be repeated herein.

In an embodiment, the computer program can be applied to the mobile device/terminal device in the embodiments of the present application, and the computer program, when executed on a computer, enables the computer to implement corresponding processes implemented by the mobile device/terminal device in the methods in the embodiments of the present application, which, for the sake of conciseness, will not be repeated herein.

Those of ordinary skill in the art will appreciate that units and algorithm steps of each example described with reference to the embodiments disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the scope of the present application.

A person skilled in the art may clearly understand that for convenience and brevity of the description, the specific working process of the system, the apparatus and the unit described above may refer to corresponding processes in the foregoing method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation. For example, multiple units or components may be combined or be integrated into another system, or some features may be ignored or not executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs to implement the purpose of the solution of the present embodiment.

In addition, each functional unit in the embodiments of the present application may be integrated into one processing unit, or each unit may physically exist independently, or two or more of the above units may be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes several instructions for enabling a computer device (which may be a personal computer, a server, or a network device, or the like) to perform all or part of the steps described in methods in the embodiments of the present application. The above storage medium includes various media that may store program codes, such as a U disk, a mobile hard disk, a read-only memory (ROM), a random access memory (RAM), a magnetic disk, or an optical disk.

The above is only specific implementation forms of the present application, the protection scope of the present application is not limited thereto, and modifications or substitutions that may easily be derived by those skilled in the art within the technical scope disclosed in the present application should be covered within the protection scope of the present application. Therefore, the protection scope of the present application should be subject to the protection scope of the claims.

What is claimed is:

1. A service authorization method, comprising:
   receiving, by a terminal device, first information from a network device, wherein the first information comprises information authorizing the terminal device to carry out a first service, wherein the first service supports transmission on a sidelink (PC5) interface and a wireless air (Uu) interface; and
   performing, by the terminal device, the first service with a group of terminal devices;
   wherein the first information further comprises at least one of the following information:
   a quality of service (QoS) parameter that is allowed to be used by the first service, and whether the QoS parameter is allowed to be applied to at least one of the PC5 interface and the Uu interface;
   indication of whether the first service is allowed to use at least one of the PC5 interface and the Uu interface; and
   indication of whether the first service is allowed to use discovery information.

2. The method according to claim 1, wherein the first information further comprises at least one of the following information:
   a radio access technology (RAT) that is allowed to be used by the first service;
   indication of whether the terminal device is allowed to act as a group header in the group of terminal devices;
   a RAT of the PC5 interface that is allowed to be used by the first service;
   indication of whether terminal devices of different public land mobile networks (PLMNs) are allowed to use the PC5 interface for group communication, and an identity of a PLMN that is allowed to use the PC5 interface for group communication;
   indication of whether the terminal device is allowed to act as a relay terminal to forward data in the first service to other terminal devices in the group of terminal devices; and
   information authorizing the first service to use at least one of unicast, multicast and broadcast to transmit on the PC5 interface.

3. The method according to claim 2, wherein in a case that the terminal device is allowed as the group header in the group of terminal devices,
   the terminal device has an ability to establish a session for the first service for other terminal devices belonging to the same group,
   the terminal device has an ability to request a wireless resource for all terminal devices belonging to the same group from the network device, and
   the terminal device is capable of serving as a medium or relay for all terminal devices belonging to the same group to communicate with the network device.

4. The method according to claim 1, wherein the QoS parameter includes at least one of the following:
   a 5th-Generation (5G) QoS index (5QI),
   a minimum guaranteed bit rate (GBR) and
   a maximum bit rate (MBR).

5. The method according to claim 1, further comprising:
   sending, by the terminal device, second information, wherein the second information indicates that the terminal device has an ability to support the first service.

6. The method according to claim 5, wherein the sending, by the terminal device, the second information, comprises:
   sending, by the terminal device, the second information in a network registration process.

7. The method according to claim 1, wherein the receiving, by the terminal device, the first information, comprises:
   receiving, by the terminal device, the first information in or after a network registration process.

8. The method according to claim 1, wherein terminal devices in a session for the first service belong to a same group, and the terminal devices in the same group come from at least one public land mobile network (PLMN).

9. The method according to claim 1, wherein the first service is a network controlled interactive service (NICS).

10. A service authorization method, comprising:
    receiving, by a network device, information from a terminal device indicating that that terminal device has an ability to support a first service; and
    sending, by the network device, first information to the terminal device wherein the first information comprises information authorizing the terminal device to carry out the first service,
    wherein the first service supports transmission on a sidelink (PC5) interface and a wireless air (Uu) interface among a group of terminal devices; and
    wherein the first information further comprises at least one of the following information:
    a quality of service (QoS) parameter that is allowed to be used by the first service, and whether the QoS parameter is allowed to be applied to at least one of the PC5 interface and the Uu interface;

indication of whether the first service is allowed to use at least one of the PC5 interface and the Uu interface; and indication of whether the first service is allowed to use discovery information.

11. The method according to claim 10, wherein the first information further comprises at least one of the following information:

a radio access technology (RAT) that is allowed to be used by the first service;

indication of whether the terminal device is allowed to act as a group header in the group of terminal devices;

a RAT of the PC5 interface that is allowed to be used by the first service;

indication of whether terminal devices of different public land mobile networks (PLMNs) are allowed to use the PC5 interface for group communication, and an identity of a PLMN that is allowed to use the PC5 interface for group communication;

indication of whether the terminal device is allowed to act as a relay terminal to forward data in the first service to other terminal devices in the group of terminal devices; and information authorizing the first service to use at least one of unicast, multicast and broadcast to transmit on the PC5 interface.

12. The method according to claim 11, wherein in a case that the terminal device is allowed as the group header in the group of terminal devices, the terminal device has an ability to establish a session for the first service for other terminal devices belonging to the same group, the terminal device has an ability to request a wireless resource for all terminal devices belonging to the same group from the network device, and the terminal device is capable of serving as a medium or relay for all terminal devices belonging to the same group to communicate with the network device.

13. The method according to claim 10, wherein the QoS parameter includes at least one of the following:

a 5th-Generation (5G) QoS index (5QI),
a minimum guaranteed bit rate (GBR) and
a maximum bit rate (MBR).

14. The method according to claim 10, wherein terminal devices in a session for the first service belong to a same group, and the terminal devices in the same group come from at least one public land mobile network (PLMN).

15. A terminal device, comprising:

a transceiver, a memory, a processor, and a computer program stored on the memory and executable by the processor, wherein the processor, when executing the computer program, is configured to:

control the transceiver to receive first information from a network device, wherein the first information comprises information authorizing the terminal device to carry out a first service, wherein the first service supports transmission on a sidelink (PC5) interface and a wireless air (Uu) interface; and perform the first service with a group of terminal devices;
wherein the first information further comprises at least one of the following information:

a quality of service (QoS) parameter that is allowed to be used by the first service, and whether the QoS parameter is allowed to be applied to at least one of the PC5 interface and the Uu interface;

indication of whether the first service is allowed to use at least one of the PC5 interface and the Uu interface; and indication of whether the first service is allowed to use discovery information.

16. The terminal device according to claim 15, wherein the first information further comprises at least one of the following information:

a radio access technology (RAT) that is allowed to be used by the first service;

indication of whether the terminal device is allowed to act as a group header in the group of terminal device;

a RAT of the PC5 interface that is allowed to be used by the first service;

indication of whether users of different public land mobile networks (PLMNs) are allowed to use the PC5 interface for group communication, and an identity of a PLMN that is allowed to use the PC5 interface for group communication;

indication of whether the terminal device is allowed to act as a relay terminal to forward data in the first service to other terminal devices in the group of terminal devices; and information authorizing the first service to use at least one of unicast, multicast and broadcast to transmit on the PC5 interface.

17. The terminal device according to claim 16, wherein in a case that the terminal device is allowed as the group header in the group of terminal devices, the terminal device has an ability to establish a session for the first service for other terminal devices belonging to the same group, the terminal device has an ability to request a wireless resource for all terminal devices belonging to the same group from the network device, and the terminal device is capable of serving as a medium or relay for all terminal devices belonging to the same group to communicate with the network device.

18. The terminal device according to claim 15, wherein the QoS parameter includes at least one of the following:

a 5th-Generation (5G) QoS index (5QI),
a minimum guaranteed bit rate (GBR) and
a maximum bit rate (MBR).

19. The terminal device according to claim 15, wherein the processor is further configured to:

control the transceiver to send second information to the network device, wherein the second information indicates that the terminal device has an ability to support the first service.

20. The terminal device according to claim 19, wherein the processor is specifically configured to:

control the transceiver to send the second information in a network registration process.

21. The terminal device according to claim 15, wherein the processor is specifically configured to:

control the transceiver to receive the first information in or after a network registration process.

22. The terminal device according to claim 15, wherein terminal devices in a session for the first service belong to a same group, and the terminal devices in the same group come from at least one public land mobile network (PLMN).

* * * * *